United States Patent [19]

Mack et al.

[11] Patent Number: 5,212,223
[45] Date of Patent: May 18, 1993

[54] EXTRUSION METHOD AND APPARATUS FOR RECYCLING WASTE PLASTICS AND CONSTRUCTION MATERIALS THEREFROM

[75] Inventors: Wolfgang A. Mack, Franklin; Peter J. Canterino, Towaco, both of N.J.

[73] Assignee: Polymerix, Inc., Cranford, N.J.

[21] Appl. No.: 664,927

[22] Filed: Mar. 5, 1991

[51] Int. Cl.⁵ .................................. C08K 5/10
[52] U.S. Cl. .......................... 524/318; 524/300; 524/424; 521/74; 521/143
[58] Field of Search ............ 524/300, 318, 424; 521/79, 143

[56] References Cited

U.S. PATENT DOCUMENTS

| | | | |
|---|---|---|---|
| 3,655,542 | 4/1972 | Tamai et al. | 521/143 |
| 3,770,663 | 11/1973 | Ueki et al. | 521/143 |
| 3,776,989 | 12/1973 | Annis, Jr. et al. | 521/143 |
| 3,818,086 | 6/1974 | Stastny et al. | 521/143 |
| 3,893,957 | 7/1975 | Mixon et al. | 521/143 |
| 4,588,754 | 5/1986 | Liu | 521/143 |
| 4,650,816 | 3/1987 | Bertrand | 521/79 |
| 4,940,736 | 7/1990 | Alteepping et al. | 521/143 |
| 4,956,396 | 9/1990 | Kim et al. | 521/79 |

OTHER PUBLICATIONS

"Polymer Processes"; ed. C. E. Schildknecht, Interscience Publishers Inc. (1956) p. 619.

*Primary Examiner*—Paul R. Michl
*Assistant Examiner*—Edward Cain
*Attorney, Agent, or Firm*—Darby & Darby

[57] ABSTRACT

An extrudable composition comprised of waste polyolefins and an alkali metal bicarbonate salt/solid, saturated fatty acid foaming agent system, and a method for extruding such extrudable composition wherein the fatty acid/bicarbonate foaming agent system foams the waste polyolefins during the extrusion to produce end products which have qualities closely simulating natural lumber suitable for use as construction materials.

27 Claims, 1 Drawing Sheet

EXTRUSION METHOD AND APPARATUS FOR RECYCLING WASTE PLASTICS AND CONSTRUCTION MATERIALS THEREFROM

BACKGROUND OF THE INVENTION

The invention is directed to an extrudable compound, an extrusion method using primarily waste polyolefin starting materials, and articles manufactured through such processes which simulate conventional outdoor construction lumber.

There are many advantages to recycling waste plastics both economical and ecological. Discarded waste plastics are available at comparatively negligible costs since they are essentially garbage. Furthermore, the present invention provides an economic incentive to remove waste plastics, which ordinarily are not completely bio-degradable, from the environment.

Waste polyolefins and other waste plastics are different from plastics fresh off a plastic manufacturer's production line because these materials have served their intended use, been discarded and exposed, often for lengthy periods, to the environment. This relatively lengthy exposure to the elements produces changes in the physical and chemical properties of the plastics. Generally, waste plastics have lower tensile strength and relatively poorer flex and thermal properties when compared to new plastics fresh off the production line.

Since waste polyolefins are not completely biodegradable, they have life cycles which are much longer than conventional wooden building materials. In addition, construction materials made from waste polyolefins have chemical, biological, mechanical, electrical and fame resistance properties superior to counterpart natural lumber products.

Surprisingly, only limited attempts have been made to develop lumber-substitute construction products from waste polyolefins. For example, U.S. Pat. No. 4,003,866 teaches construction material made from waste thermoplastic resins and other non-plastic fillers. The non-plastic fillers are coated or encapsulated with a recycled polyethylene or polypropylene wax. Because of the complexity of the process disclosed and the limited improvement provided by the wax encapsulated materials over natural materials, the products made from this disclosure have very narrow practical application.

Maczko, J., *A System to Mold Mixed, Contaminated Plastics into Wood, Metal and Concrete Replacements*, RECYCLING-PLAS II, Conference of Plastics Institute of America, Jun. 18-19, 1987, Washington, D.C., describes the ET-1 process for producing substitute construction materials from waste plastics. The described method is claimed to be able to transform mass waste plastics directly into a large range of molded end products without presorting of any kind, and without the need for inserting any additives to the intermediate resin.

The ET-1 process melts resins in a short-screw extruder, then forces the heated extrudate into a series of linear molds which are then mounted onto a turret. The heated molds cool as the turret rotates them through a water filled tank. The end products are air-ejected from open ends of the molds.

The ET-1 end product is essentially a solid with randomly spaced voids. It has a typical specific gravity slightly higher than 1.0 gm/cc, making it heavier than most natural timber products (ordinarily, wood floats on water because it has a density less than that of water). The length of the end products are limited by the size of the mold into which the extruder can inject and fill with resin. Practically, as construction material, these end products are generally difficult to cut, saw, nail or drill holes into.

Accordingly, there is a need for a recycled waste plastic material which has qualities closely resembling natural lumber such as consistency, texture and density which will be readily accepted by the construction industry as a replacement for wood. Such materials can be used by architects, construction engineers and manual construction laborers by applying heir currently known skills to the use of such recycled waste plastic products.

Known extrusion methods have not been able to satisfactorily convert waste plastics into products that have uniform dimension due to variations in the feed composition, and the end products produced, undesirably and unpredictably, vary in size, configuration and thickness. The need therefore exists for an extrusion process which produces end products derived from waste plastics with substantially uniform dimensions conforming to conventional construction standards of any desired length.

SUMMARY OF THE INVENTION

To overcome the problems and deficiencies of the currently available art, the present invention provides an improved, extrudable composition; an extrusion method for continuously producing improved composites from waste polyolefins; and the improved, composite end product which closely resembles construction lumber.

The extrudable composition used as the starting material contains at least 50% waste polyolefin; from 0.1% to 1.5% of a Group 1A alkali metal bicarbonate; and from 0.6 to 2.0 molar equivalents of the bicarbonate salt, of a saturated fatty acid, which is solid at room temperature (20° C., 1 atm). The preferred alkali metal salts are sodium or potassium bicarbonate. Suitable saturated fatty acids include those with carbon chains of from 14 to 22 carbons such as myristic acid, palmitic acid, stearic acid, arachidic acid, and mixtures, such as tallow fatty acids. The preferred foaming agent system is a sodium bicarbonate/solid stearic acid combination.

The foaming agent components react in situ in the waste polyolefin to form products which serve several functions. Using, the preferred system, for example, in addition to the formation of $CO_2$ for foaming, sodium stearate is formed by the reaction of the sodium bicarbonate with the stearic acid. Sodium stearate, along with unreacted stearic acid, helps disperse the filler materials during extrusion. The stearate also lubricates the melt in the extruder as the semi-solid mass passes through the sizing sleeve, reducing "seizing" and sticking. The sodium stearate present in the final product also acts as a hydrogen chloride scavenger, and as an anionic compound which helps "bleed off" static charges which may otherwise build up during actual use of the end product.

The extruded products have a specific gravity of from 0.4 gm/cc to 0.9 gm/cc, in contrast to conventional recycled waste plastic compositions which generally have specific gravities in excess of 1.0 gm/cc. The foaming serves to reduce the density in the final product thereby saving the amount of raw materials required for a given volume and increases the strength-to-weight ratios of the end-products.

In the extrudable composition, the preferred resin is that obtained by grinding post-consumer mixed plastics containing mainly polyolefins. The term "polyolefins" as used herein refers to HDPE, LDPE, LLDPE, UHMWPE, homopolymers of polypropylene, copolymers of ethylene and propylene, and combinations thereof.

"Waste polyolefins" as the term is used herein, contains at least 80% by weight polyolefins as defined above and, additionally, up to 20% by weight of one or more other polymeric materials such as rigid or flexible PVC; polystyrene; chloro-sulfonated polyethylenes; unmodified, compounded, reinforced, alloys or blends of engineering plastics such as polyamides, polycarbonates, thermoplastic polyesters (PET or PBT), ABS, polyphenylene oxide and polyacetals; and combinations thereof.

As is evident from the preceding, the waste polyolefins used as the starting materials for the present invention are a heterogeneous mixture of a wide range of plastics. They are obtained from industrial, commercial and residential garbage by initially removing the bulk of non-plastic contaminants such as dirt, spoiled food, paper, cloth and metals.

The compositions of the present invention may also include fibrous reinforcing agents for providing strength and improved impact properties to the molded end products, and filler materials for providing stiffness, additional strength, and enhanced mechanical and heat resistance. The reinforcing agent can be present in amounts from 0 to 50% of total weight of the composition, preferably at least 20% of total weight; and the filler materials from 0 to 20% of total weight, preferably at least 5% of total weight of the composition. Both the reinforcer and the filler content are adjusted to the type and quality of end product desired.

The preferred reinforcing agent is chopped strands of glass fiber. Appropriate coupling agents, such as silanes or organo-titanates, can also be used to enhance reinforcement.

Filler materials which can be used include calcium carbonate, asbestos, mica, wollastonite, talc, diatomaceous earth, kaolin clays, alumina trihydrates, calcium metasilicate, metal flakes, ceramics, carbon filaments and the like. A single filler or a combination of fillers can be added, and the filler can also be derived from recyclable waste.

DETAILED DESCRIPTION OF THE INVENTION

Figure 1:
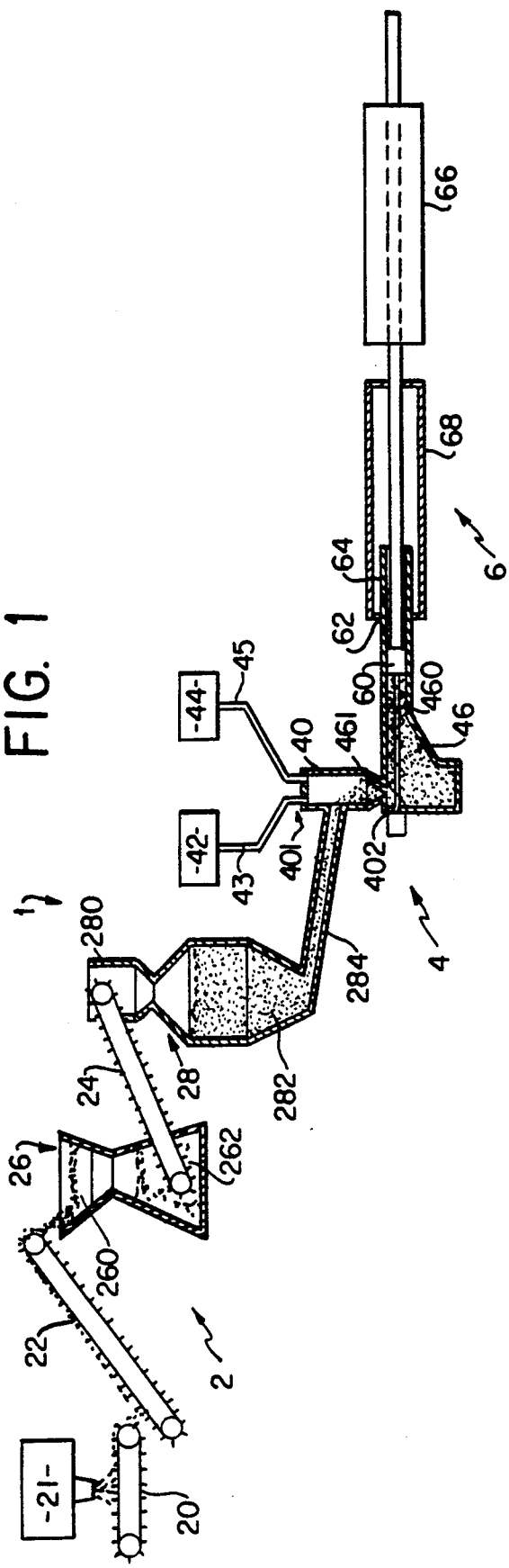
FIG. 1 shows a partial, cut-away schematics depicting the extrusion apparatus used in the present invention, designated generally by reference numeral 1.
Figure 2:
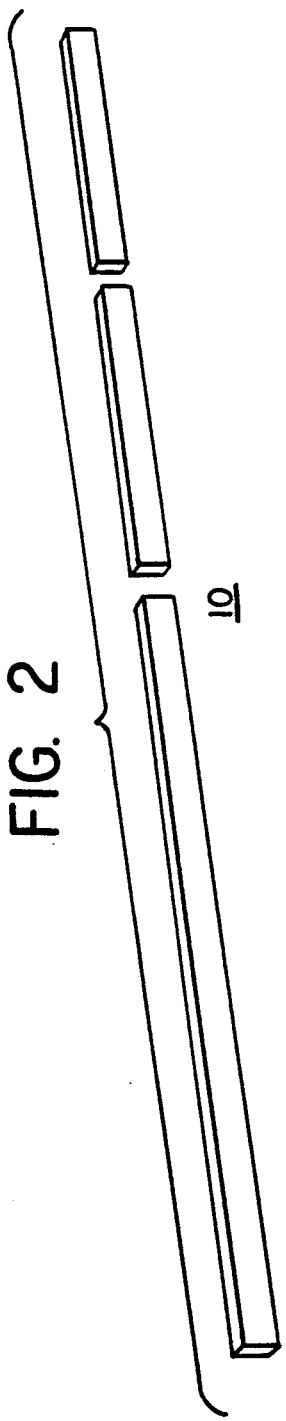
FIG. 2 depicts an example of an end product of the present invention, designated by reference numeral 10.

Referring to the drawings, FIG. 1 shows a detailed diagram of extrusion apparatus 1, which includes a feeding section 2, a mixing section 4, and a shaping section 6.

Feeding section 2 includes a plurality of conveyors 20, 22, 24, a shredder 26 and a silo 28. Conveyor 20 transports bales of waste polyolefins 21 to conveyor 22; conveyor 22 feeds the bales into input end 260 of shredder 26 where the bales are shredded into a finer material; and conveyor 24 transports the shredded waste polyolefins from output end 262 of shredder 26 to input portion 280 of silo 28 for storage. Silo 28 includes a discharge portion 282, which communicates with a channel 284 to connect silo 28 with a hopper 40 of the mixing section 4. Shredder 26, silo 28 and conveyors 20, 22 and 24 are conventional, and units other than those shown in FIG. 1 can be utilized.

It should be noted that feeding section 2 as shown in FIG. 1 is not essential to the practice of the present invention. When waste polyolefins are finely sorted (i.e. a relatively more detailed pre-sorting for impurities such as paper, dirt, spoiled food, metals and non-waste-polyolefins is performed), feeding section 2, which includes shredder 26, can be eliminated, and the pre-sorted waste polyolefins can be fed directly into the hopper 40 of mixing section 4.

The mixing section 4 is shown disposed downstream of the feeding section 2 and includes a hopper 40, a reinforcing agent storage container 42, a foaming agent storage container 44, and an extruder 46. Channel 43 and channel 45 provide for communication between input end 401 of hopper 40 and storage containers 42 and 44, respectively. Discharge end 402 of hopper 40 communicates with an opening 461 in extruder 46.

The reinforcing agent is introduced from first storage container 42 via channel 43 into the waste polyolefins in hopper 40. Filler materials can also be added at this point from storage container 42 via channel 43.

The extruder 46, has a conventional screw 460 which rotates to force the waste polyolefin stream out of the discharge end of extruder 46 and into the die 60 of shaping section 6. The screw 460 also functions to further mix the foaming agent and reinforcing agent with the waste polyolefin stream. Extruder 46 has a conventional heating means (not shown) to convert the waste polyolefin stream into a molten state.

As noted above, when relatively finer pre-sorted waste polyolefins are involved, feeder 26, silo 28 and conveyors 20, 22, and 24 can be eliminated, and the polyolefins are introduced directly into hopper 40. If the feed is composed of many different types of waste polyolefins (as defined above), they can be dry-blended before being introduced into extruder 46. The waste polyolefin stream can alternatively be pre-blended with the reinforcing agent and the foaming agent system prior to introduction into the hopper 40.

Turning now to shaping section 6 which is disposed downstream of mixing section 4, it includes a die 60, a die extension 62 communicating with die 60, a sizing sleeve 64, and a puller or take away means 66. The extrudate emerging from extruder 46 is forced through die 60 and die extension 62 by screw 460 of extruder 46. Most of the foaming occurs in die extension 62. The sizing sleeve 64, disposed downstream of die extension 62, is dimensioned so that its inside diameter corresponds to the maximum desired outside diameter of the end product.

Puller 66 operates to pull the extrudate through sizing sleeve 64. The puller 66 can be of any conventional type such as a plurality of rollers (not shown) which grip the extrudate therebetween. Sizing sleeve 64 is immersed in a water trough 68, as is known in the art, to cool the extrudate and to rigidify it as it exits from the sizing sleeve 64.

As stated above, use of the foaming agent in the present method enables the production of a recycled plastic which has wood-like densities evenly and continuously distributed throughout the end-product, and which can be extruded to any desirable dimension. These composites can be nailed, screwed, sawed and bolted with conventional woodworking tools and skills, and unlike wood, these products will not rot and degrade when exposed to the environment and the strength of the product will remain constant whether wet or dry.

The end-product compositions of the present invention do not require addition of conventional stabilizers to protect against thermo-oxidative degradation, because the polymer resin matrix derived from waste plastics generally contains stabilizers. Random samplings of collected waste plastics contain from 0.05 to 0.5% stabilizer based on the total polymer resin matrix. However, the invention contemplates addition of useful stabilizers such as those well known in the art if necessary.

To the compositions of this invention there may additionally be added ultraviolet absorbers and antifungal agents, depending on the ultimate intended use of the extruded product.

In addition to extrusion, the compositions of this invention may be injection molded to produce commercially usable products. To such ends, other additives can be used, including impact modifiers, viscosity stabilizers, processing aids, and coloring agents.

The following examples demonstrate the actual production of the compositions of the present invention.

EXAMPLE 1

Initially, a comparative study was performed using various forms of organic acid/sodium bicarbonate foaming agent systems. As this example demonstrates, the stearic acid system showed the lowest density end product.

To one pound of high density polyethylene was added the following organic acids with a stoichiometric equivalent, (4.52 gm) of sodium bicarbonate. The two ingredients were dry blended with the polyethylene. The blends were then extruded by the use of a 1-inch extruder with the following temperature profile: the melting zone, 200° C.; the pumping/metering zone 180°–21020 C.; and die temperature, 200° C.

Sample strands of final product were collected and their specific gravities measured. The results are summarized in the following table:

TABLE 1

| Sample | Organic acid (gm) | Specific gravity of foam (gm/cc) |
|---|---|---|
| control | — | 0.95 |
| stearic acid | 14.7 | 0.47 |
| isophthalic acid | 4.5 | 0.62 |
| benzoic acid | 6.1 | 0.60 |
| citric acid | 4.5 | 0.80 |

EXAMPLE 2

A masterbatch of foaming agent was prepared by mixing the following ingredients in the following ratios:

| | Parts |
|---|---|
| Mica (carrier/filler material) | 50.0 |
| NaHCO$_3$ | 3.0 |
| Stearic Acid | 9.0 |

In a twin screw extruder (Berstorff ZE 40-A) was fed a blend of 25% glass fibers and 72% high density polyethylene (0.7 melt index, 0.96 gm/cc). As a side feed, 4% of masterbatch was added (to give 0.2 and 0.6 weight % foaming agent, NaHCO$_3$-stearic acid). The melt was forced through a die and a sizing sleeve and into a water trough to give a 2×4 inch extruded structure resembling wood. The expected specific gravity for high density polyethylene with 25% glass fiber was 1.2 gm/cc. Surprisingly, the density of the extrudate was found to be 0.69 gm/cc. Smooth extrusion with good filler dispersion was observed. Evenly distributed, uniform foam structure was observed during extruding.

EXAMPLE 3

Commingled waste polyolefin plastic containers randomly obtained from household, curb-side garbage, after substantial separation of PET carbonated beverage containers, were put through a grinder and reduced to flake.

A masterbatch foam system of the following composition was prepared by mixing the following ingredients in the following ratios:
50.0 parts ground mollusk shells (97.5% CaCO$_3$)
9.0 parts stearic acid
3.0 parts sodium bicarbonate
The following components were fed to a twin-screw 60 mm extruder:

| | PARTS |
|---|---|
| Ground waste polyolefin flakes | 70.0 |
| Glass fibers | 20.0 |
| Masterbatch foam system | 10.0 |

The three ingredients were metered separately, the ground polyolefin flakes at the throat of the extruder, and the glass fiber and masterbatch through a side-feeder at a point where the resin was molten. The total feed was 300 lbs/hr. A smooth extrusion with no sticking in the sizing sleeve and a good dispersion of the glass fibers and ground mollusk shells materials was observed. The density of the continuously extruded end-product over an 8 hour period was between 0.73 to 0.88 gm/cc.

EXAMPLE 4

A series of compositions were made using various fillers and resin blends using the same rates as in Example 3. The resulting densities of these compositions are shown in Tables 2 and 3. The numerals which precede percentage symbols denote the percentage concentration of that particular ingredient relative to the total weight of the end products.

TABLE 2

| | COMPOSITION NO.: | | | | |
|---|---|---|---|---|---|
| INGREDIENT | 1 | 2 | 3 | 4 | 5 |
| WASHED WASTE POLYOLEFIN | | | | 71.9% | |
| UNWASHED WASTE POLYOLEFIN | 71.9% | 71.9% | 56.7% | | 61.9% |
| POLYSTYRENE | | | 15.2%* | | 10.0%** |
| WASTE GLASS FIBER | | 20.0% | 20.0% | 20.0% | 20.0% |
| PRIME GLASS FIBER | 20.0% | | | | |

TABLE 2-continued

|  | COMPOSITION NO.: | | | | |
| --- | --- | --- | --- | --- | --- |
|  | 1 | 2 | 3 | 4 | 5 |
| GROUND OYSTER SHELLS | 6.5% | 6.5% | 6.5% | 6.5% | 6.5% |
| STEARIC ACID | 1.2% | 1.2% | 1.2% | 1.2% | 1.2% |
| SODIUM BICARBONATE | 0.4% | 0.4% | 0.4% | 0.4% | 0.4% |
| DENSITY gm/cc. | 0.78 | 0.77 | 0.79 | 0.80 | 0.78 |

*Crystalline polystyrene
**Expandable polystyrene

TABLE 3

|  | COMPOSITION NO.: | | | | |
| --- | --- | --- | --- | --- | --- |
|  | 6 | 7 | 8 | 9 | 10 |
| INGREDIENT |  |  |  |  |  |
| GROUND WASTE POLYOLEFIN | 37.3% | 34.8% | 71.9 | 71.9% | 71.9% |
| GROUND WASTE POLYPROPYLENE | 34.6% | 34.6% |  |  |  |
| GLASS FIBERS | 20.0% | 20.0% | 20.0% | 20.0% | 20.0% |
| DIATOMACEOUS EARTH |  |  |  |  | 6.5% |
| GROUND OYSTER SHELLS (97.5% CaCO₃) | 6.5% | 6.5% | 6.5% | 6.5% |  |
| EMULSIFYABLE POLYETHYLENE WAX |  | 2.5% |  |  |  |
| STEARIC ACID | 1.2% | 1.2% | 1.2% | 1.2% | 1.2% |
| SODIUM BICARBONATE | 0.4% | 0.4% | 0.4% | 0.4% | 0.4% |
| DENSITY gm/cc. | 0.82 | 0.86 | 0.72 | 0.78 | 0.75 |

It will be appreciated that the instant specification and claims are set forth by way of illustration and not limitation, and that various modifications, additions or substitutions may be made without departing from the spirit and scope of the present invention.

What is claimed is:

1. An extrudable composition for making construction material, comprising a dry blend of:
   at least 50%, based of total weight of said composition, of a used polyolefinic material derived from residential, commercial, or industrial waste;
   about 0.1 to 1.5%, based on the total weight of said composition, of an alkali metal bicarbonate; and
   in a molar ratio of about 1:1 to 2:1 with respect to said bicarbonate, a saturated fatty acid which is a solid at room temperature, the amount of said alkali metal bicarbonate and said fatty acid being sufficient to form, upon extrusion, a foamed construction material having a specific gravity of 0.4 to 0.9; and
   about 2 to 50% of a reinforcing material.

2. The composition of claim 1 wherein said polyolefinic material is high density polyethylene.

3. The composition of claim 1 wherein the polyolefinic component of said waste polyolefinic material is HDPE, LDPE, LLDPE, UHMWPE, a homopolymer of polypropylene, a copolymer of ethylene and propylene or mixtures thereof.

4. The composition of claim 3 wherein said waste polyolefinic material contains a non-polyolefinic component comprising rigid PVC, flexible PVC, chloro-sulfonated polyethylene, polyamide, polycarbonate, PET thermoplastic polyester, PBT thermoplastic polyester, ABS, polyphenylene oxide, polyacetal or a mixture thereof.

5. The composition of claim 4 wherein said non-polyolefinic component comprises from about 0.5% to about 20% by total weight of said composition.

6. The composition of claim 1 wherein said fatty acid is selected from the group consisting of myristic acid, palmitic acid, stearic acid, arachidic acid and mixed tallow fatty acids.

7. The composition of claim 1 wherein said alkali metal bicarbonate is sodium bicarbonate or potassium bicarbonate.

8. The composition of claim 1 further comprising:
   a glass fiber reinforcing agent; and
   a filler of calcium carbonate, asbestos, mica, wollastonite, talc, diatomaceous earth, kaolin clays, alumina trihydrates, calcium metasilicate, metal flakes, ceramics, or carbon filaments.

9. The composition of claim 8 wherein said filler is present in an amount between about 5% to 20% of total weight of said extrudable composition.

10. A foam composition having a specific gravity of 0.4 to 0.9 formed by a continuous extrusion process in the presence of a saturated fatty acid and an alkali metal bicarbonate in a molar ratio of from 1:1 to 2:1 and suitable for use as a substitute for construction lumber, comprising:
    at least 50%, based on total weight of said composition, of a used polyolefinic material derived from residential, commercial, or industrial waste; and
    an anionic salt of an alkali metal carboxylate of a saturated fatty acid; and
    about 2 to 50% of a reinforcing material.

11. The extruded composition of claim 10 wherein said fatty acid is myristic acid, palmitic acid, stearic acid, arachidic acid or a mixed tallow fatty acid.

12. The extruded composition of claim 10 wherein the polyolefinic component of said waste polyolefinic material is high density polyethylene.

13. The extruded composition of claim 10 further comprising:
    ,a glass fiber reinforcing agent; and
    a filler of calcium carbonate, asbestos, mica, wollastonite, talc, diatomaceous earth, kaolin clay, alumina trihydrate, calcium metasilicate, metal flakes, ceramics, or carbon filaments.

14. The extruded composition of claim 10 wherein said alkali metal is sodium or potassium.

15. The extruded composition of claim 10 wherein the polyolefinic component of said waste polyolefinic material is HDPE, LDPE, LLDPE, UHMWPE, a homopolymer of polypropylene, or a copolymer of ethylene and propylene or mixtures thereof.

16. The extruded composition of claim 15 wherein said waste polyolefinic material contains a non-polyolefinic component comprising rigid PVC, flexible PVC, chloro-sulfonated polyethylene, polyamide, polycarbonate, PET thermoplastic polyester, PBT thermoplastic polyester, ABS, polyphenylene oxide, polyacetal or mixtures thereof.

17. The extruded composition of claim 16 wherein said non-polyolefinic component comprises from about 0.5% to about 20% by total weight of said composition.

18. The extruded composition of claim 13 wherein said filler is present in an amount between about 5% to 20% of total weight of said composition.

19. The extruded composition of claim 13 wherein said reinforcing agent is present in an amount between about 2% to 50% of total weight of said composition.

20. A method of making a composite foam extruded product which simulates lumber comprising the steps of:
continuously supplying to an extruder used polyolefinic material derived from residential, commercial, or industrial waste;
blending with said polyolefinic material an alkali metal bicarbonate and a saturated fatty acid which is a solid at room temperature, said bicarbonate being at a concentration of about 0.1 to 1.5% of total weight of said blend and said fatty acid being in a molar ratio of from about 1:1 to 2:1 with respect to said bicarbonate and about 2 to 50% of a reinforcing material;
extruding a melt of said blend through a profile die;
forming a foaming agent and a lubricant for said blend by the in situ reaction of said bicarbonate and said fatty acid;
feeding the lubricated blend from said die into a sizing zone wherein the blend is foamed to substantially its final cross-section;
cooling the thus-foamed material in said sizing zone so as to rigidify the foamed material; and
forcing and pulling the rigidified material through and from said sizing zone.

21. The method of claim 20 further comprising:
adding a glass fiber reinforcing agent and a filler material to said extruder, said filler material being calcium carbonate, asbestos, mica, wollastonite, talc, diatomaceous earth, kaolin clay, alumina trihydrate, calcium metasilicate, metal flakes, ceramics, or carbon filaments.

22. The method of claim 20 wherein said fatty acid is myristic acid, palmitic acid, stearic acid, arachidic acid or a mixed tallow fatty acid.

23. The method of claim 20 wherein said alkali metal bicarbonate is sodium bicarbonate or potassium bicarbonate.

24. The method of claim 20 wherein the polyolefinic component of said waste polyolefins is high density polyethylene.

25. The method of claim 20 wherein the polyolefinic component of said waste polyolefins is HDPE, LDPE, LLDPE, UHMWPE, a homopolymer of polypropylene, a copolymer of ethylene and propylene or mixtures thereof.

26. The method of claim 25 wherein said waste polyolefins contains a non-polyolefinic component which is a rigid PVC, flexible PVC, chloro-sulfonated polyethylene, polyamide, polycarbonate, PET thermoplastic polyester, PBT thermoplastic polyester, ABS, polyphenylene oxide, polyacetal or a mixture thereof.

27. The method of claim 26 wherein said non-polyolefinic component comprises from about 0.5% to about 20% by total weight of said composition.

* * * * *